United States Patent
Iwai (10) Patent No.: US 10,089,212 B2
(45) Date of Patent: Oct. 2, 2018

(54) MEMORY SYSTEM, INFORMATION PROCESSING SYSTEM, AND HOST DEVICE OUTPUTTING DEBUGGING INFORMATION THROUGH A HOST INTERFACE

(71) Applicant: Toshiba Memory Corporation, Minato-ku (JP)

(72) Inventor: Daisuke Iwai, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 93 days.

(21) Appl. No.: 15/066,664

(22) Filed: Mar. 10, 2016

(65) Prior Publication Data

US 2017/0024266 A1    Jan. 26, 2017

Related U.S. Application Data

(60) Provisional application No. 62/194,477, filed on Jul. 20, 2015.

(51) Int. Cl.
*G06F 11/07* (2006.01)
*G06F 11/36* (2006.01)

(52) U.S. Cl.
CPC ............... *G06F 11/3656* (2013.01)

(58) Field of Classification Search
CPC ............ G06F 11/3466; G06F 11/3471; G06F 11/349; G06F 11/364; G06F 11/3656
See application file for complete search history.

(56) References Cited

U.S. PATENT DOCUMENTS

| | | | | |
|---|---|---|---|---|
| 5,689,694 A * | 11/1997 | Funyu | ................... | G06F 9/3804 712/234 |
| 6,047,353 A * | 4/2000 | Vishlitzky | ........... | G06F 11/3485 711/111 |
| 6,539,500 B1 * | 3/2003 | Kahle | ................ | G06F 11/3636 710/18 |
| 6,609,164 B1 * | 8/2003 | Kallat | .................... | G06F 13/28 710/22 |
| 7,047,521 B2 * | 5/2006 | Bunnell | ............. | G06F 11/3466 714/E11.2 |
| 8,001,428 B2 * | 8/2011 | Ashfield | ............. | G06F 11/3466 714/18 |
| 8,561,170 B2 * | 10/2013 | Katayama | ............... | G06F 21/31 713/182 |
| 8,639,986 B2 * | 1/2014 | Aphale | ............... | G06F 11/3636 370/257 |

(Continued)

FOREIGN PATENT DOCUMENTS

| | | |
|---|---|---|
| JP | 2003-150403 | 5/2003 |
| JP | 2007-537547 | 12/2007 |
| JP | 2014-203106 | 10/2014 |

*Primary Examiner* — Elmira Mehrmanesh
(74) *Attorney, Agent, or Firm* — Oblon, McClelland, Maier & Neustadt, L.L.P.

(57) ABSTRACT

An embodiment provides a memory system connectable to a host device. The memory system includes a host interface configured to receive a read command and a write command and a first non-volatile memory. In addition, the memory system includes a debug unit configured to collect debugging information when a processor executes firmware. The debug unit is capable of outputting the debugging information to a buffer area of the host device through the host interface.

17 Claims, 10 Drawing Sheets

(56) References Cited

U.S. PATENT DOCUMENTS

| | | | |
|---|---|---|---|
| 8,825,922 B2* | 9/2014 | Mayer | G06F 11/3476 710/22 |
| 9,003,375 B2* | 4/2015 | Brandt | G06F 11/3466 714/45 |
| 2003/0005271 A1* | 1/2003 | Hsu | G06F 9/3802 712/237 |
| 2005/0268177 A1 | 12/2005 | John | |
| 2006/0117229 A1* | 6/2006 | Swaine | G06F 11/348 714/45 |
| 2013/0054871 A1* | 2/2013 | Lassa | G06F 3/061 711/103 |
| 2015/0058532 A1 | 2/2015 | Sugimoto et al. | |

* cited by examiner

MEMORY SYSTEM, INFORMATION PROCESSING SYSTEM, AND HOST DEVICE OUTPUTTING DEBUGGING INFORMATION THROUGH A HOST INTERFACE

CROSS-REFERENCE TO RELATED APPLICATIONS

This application is based upon and claims the benefit of priority from U.S. Provisional Application No. 62/191,477, filed on Jul. 20, 2015; the entire contents of which are incorporated herein by reference.

FIELD

Embodiments described herein relate generally to a memory system, an information processing system, and a host device.

BACKGROUND

There is a ball grid array SSD (BGASSD) that is provided in one chip as one type of memory system. In the BGASSD, for example, a memory, such as a solid state drive (SSD), and a device controller that controls the memory are provided in one chip.

In this memory system, there is a limit in the number of times data is written to a NAND memory used in the SSD. Therefore, when the memory system operates for a long time, the debugging performance of control firmware (FW) deteriorates. However, it is difficult to monitor the operation of the processor from pins of the memory system. In addition, when a problem occurs, the problem is analyzed on the basis of the content of a register or a static random access memory (SRAM). Therefore, the experience or know-how of an analyzer is required to analyze the problem.

As one of methods for debugging the memory system, there is a method in which a debug support unit of a processor has a command tracing function and a host device acquires trace information through, for example, a dedicated bus.

However, in this method, the cost of debugging is high and it is difficult to obtain trace information after the memory system is shipped. Therefore, it is necessary to develop a memory system which can easily obtain trace information at a low cost.

DETAILED DESCRIPTION

According to one embodiment, there is provided memory system connectable to a host device. The memory system includes a host interface configured to receive a read command and a write command. The memory system further includes a first non-volatile memory configured to read data in response to the read command and to store data in response to the write command. The memory system further includes a debug unit configured to collect debugging information. The memory system further includes a processor configured to execute firmware to control the memory system. The firmware has a function of receiving a debug command and a function of setting a buffer address to the debug unit, the buffer address indicating a buffer area allocated on a memory in the host device. The debug unit is capable of outputting the debugging information to the buffer area through the host interface when the processor executes the firmware.

Hereinafter, a memory system, an information processing system, and a host device according to embodiments will be described in detail with reference to the accompanying drawings. The invention is not limited by the embodiments.

First Embodiment

Figure 1:
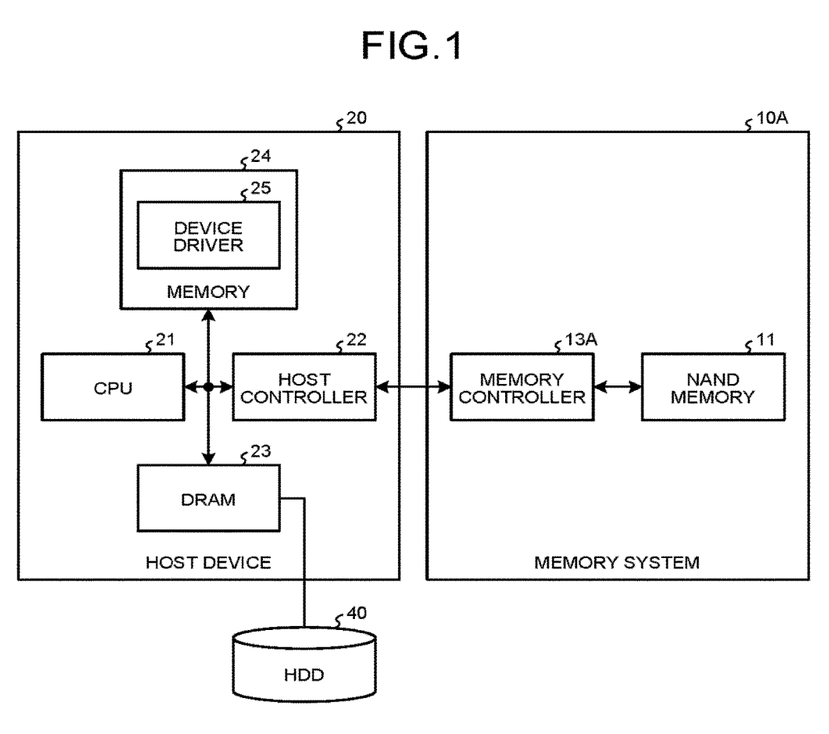
FIG. 1 is a diagram illustrating an example of the structure of an information processing system according to a first embodiment.

FIG. 1 is a diagram illustrating an example of the structure of an information processing system according to a first embodiment. The information processing system includes a host device (external device) 20 and a memory system (memory device) 10A which operates as an external storage device of the host device 20. In the information processing system, the memory system 10A writes data to a memory (for example, a DRAM 23 which will be described below) of the host device 20.

The memory system 10A is configured such that it can be connected to the host device 20. The memory system 10A is connected to the host device 20 by a predetermined communication interface. For example, peripheral component interconnect express (PCIe) can be used as a communication interface standard.

An access command (a read command and a write command) which is received from the host device 20 by the memory system 10A includes a logical block address (LBA).

The memory system 10A includes a NAND memory 11 and a memory controller (device controller) 13A. The NAND memory 11 and the memory controller 13A are connected to each other by a bus.

The NAND memory 11 includes a non-volatile storage device (for example, a non-volatile semiconductor memory). The memory controller 13A controls the NAND memory 11 and transmits data to the host device 20. In this embodiment, the memory controller 13A transmits debugging information (command trace information) to the host device 20.

The debugging information is a command history from a CPU 33 (which will be described below) of the memory controller 13A. The debugging information includes, for example, a command fetch address and a timer value.

The NAND memory 11 includes one or more memory chips each having a memory cell array. In this embodiment, the memory chip is a NAND chip. However, the invention is not limited thereto.

The memory cell array includes a plurality of memory cells which are arranged in a matrix. Each block of the memory cell array includes a plurality of pages. Each page is, for example, the unit of data reading and writing. The NAND memory 11 stores, for example, user data transmitted from the host device 20.

The memory controller 13A controls a process of reading data from the memory chip on the basis of a read command which input from the outside and a process of writing data to the memory chip on the basis of a write command which is input from the outside. The memory controller 13A manages the correspondence relationship between an LBA included in the read command and the storage position (physical address) of read data to be read in response to the read command.

In this embodiment, the memory system 10A spontaneously transmits the debugging information to the host device 20. For example, the debugging information transmitted by the memory system 10A is used for debugging. The information processing device is, for example, a personal computer, a mobile terminal, or an imaging device.

The host device 20 includes a central processing unit (CPU) 21, a dynamic random access memory (DRAM) 23, a host controller 22, and a memory 24. The CPU 21, the DRAM 23, the host controller 22, and the memory 24 are connected to each other by a bus.

The CPU 21 executes an operating system (OS) or a user program to control the host device 20. The DRAM 23 is a memory that stores the debugging information transmitted from the memory system 10A.

The debugging information stored in the DRAM 23 is written to a non-volatile memory at a predetermined time. The non-volatile memory is, for example, a hard disk drive (HDD) 40. The HDD 40 may be provided inside or outside the host device 20.

The host controller 22 controls the transmission and reception of data to and from the memory system 10A. The host controller 22 transmits a write command and a read command to the memory controller 13A.

The host controller 22 transmits a trace start command (trace output validation command) to start a trace to the memory controller 13A. In addition, the host controller 22 transmits a trace stop command (trace output invalidation command) to stop the trace to the memory controller 13A. The host controller 22 receives the debugging information from the memory controller 13A. The host controller 22 is, for example, a microcomputer unit including an arithmetic device or a storage device.

The memory 24 stores a device driver 25. The CPU 21 reads the device driver 25 from the memory 24 and develops the device driver 25 in a predetermined program storage area. In this way, various processes in the device driver 25 are performed. In other words, the CPU 21 executes the device driver 25 to implement each function of the device driver 25.

In this embodiment, the device driver 25 allocates a memory area (buffer) for storing the debugging information when the host controller 22 transmits the trace start command to the memory system 10A. The buffer allocated by the device driver 25 is a trace output buffer. The device driver 25 allocates successive physical addresses as the buffer area.

The device driver 25 transmits the buffer address of the allocated buffer to the memory controller 13A. In addition, the device driver 25 sets a logical address corresponding to the physical address such that a user application (a storage application which will be described below) can acquire the debugging information from the buffer. In other words, the device driver 25 maps the physical address of the buffer to a virtual address. Here, the physical address is the physical address of the storage area of the debugging information in the buffer. The device driver 25 frees (releases) the allocated buffer and performs unmapping (releases mapping) when the host controller 22 transmits the trace stop command to the memory system 10A.

Figure 2:
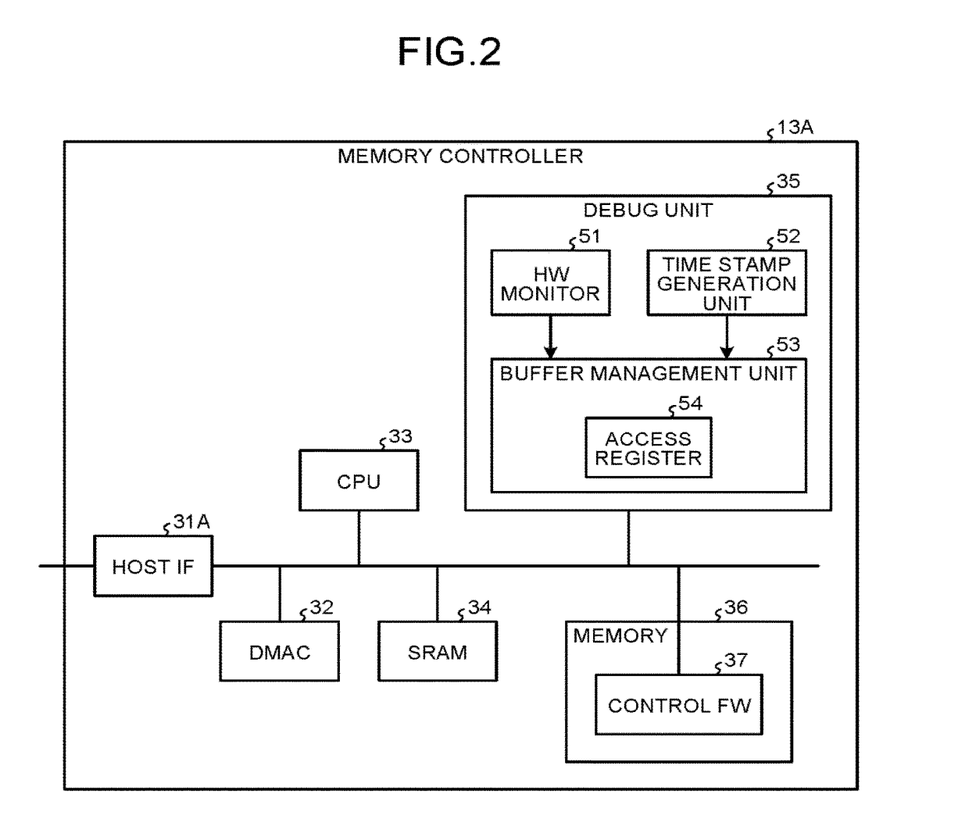
FIG. 2 is a diagram illustrating an example of the structure of a memory controller according to the first embodiment.

FIG. 2 is a diagram illustrating an example of the structure of the memory controller according to the first embodiment. The memory controller 13A includes a host interface (IF) 31A, a DMAC 32, a CPU 33, a static random access memory (SRAM) 34, a debug unit 35, and a memory 36. In the memory controller 13A, the host IF 31A, the DMAC 32, the CPU 33, the SRAM 34, the debug unit 35, and the memory 36 are connected to each other by a bus.

The host IF 31A controls a communication interface with the host device 20. The host IF 31A receives various commands output from the host device 20 or transmits and receives data to and from the host device 20. The host IF 31A is, for example, PCIe.

In this embodiment, the debugging information is transmitted from the memory system 10A to the host device 20 through the host IF 31A which is used to transmit and receive, for example, user data to and from the host device 20. In other words, the host IF 31A transmits the debugging information to the host device 20, using the same communication protocol as that used to transmit the write command and the read command. The host IF 31A may be any communication interface as long as it can be used to transmit and receive data between the host device 20 and the memory system 10A.

The memory 36 is a non-volatile memory that stores control firmware 37. The control firmware 37 may be stored in the NAND memory 11. The control firmware 37 is read and executed by the CPU 33. The CPU 33 reads the control firmware 37 from the memory 36, develops the control firmware 37 in a predetermined program storage area, and performs various processes in the control firmware 37. In other words, the CPU 33 executes the control firmware 37 to implement each function of the control firmware 37. In addition, come or all of the components of the control firmware 37 may be implemented by a hardware circuit such as an application specific integrated circuit (ASIC).

In this embodiment, the control firmware 37 receives a vendor command (for example, a debug command) which is instruction information from the host device 20. The instruction information from the host device 20 includes, for example, a trace start command (ON command) to start a trace, a trace stop command (OFF command) to stop the trace, and the buffer address (address) of a buffer for storing the debugging information. The buffer address is the address of the DRAM 23. In addition, the control firmware 37 sets the buffer address allocated by the host device 20 as the output destination of the debugging information from the debug unit 35.

The control firmware 37 sets the buffer address allocated by the host device 20 as the output destination of the debugging information. In this case, the control firmware 37 extracts the buffer address from the instruction transmitted from the host device 20 and sets the buffer address as the output destination. The control firmware 37 notifies the debug unit 35 of the set buffer address.

The debug unit (HW/debug monitor) 35 has a function of monitoring the debugging of the memory system 10A. The debug unit 35 collects a command fetch address. Specifically, the debug unit 35 monitors the bus in the memory controller 13A. When predetermined conditions are satisfied, the debug unit 35 reads a command code (instruction) and stores the command code as the command fetch address. In addition, when predetermined conditions are satisfied, the debug unit 35 outputs the debugging information to the buffer address designated by the host device 20. The debug unit 35 is, for example, hardware.

The debug unit 35 includes a hardware (HW) monitor 51, a time stamp generation unit 52, and a buffer management unit 53. The HW monitor 51 monitors a command code in the bus of the memory controller 13A. When the command code satisfies predetermined conditions, the HW monitor 51 stores the command code as the command fetch address in the buffer management unit 53.

The time stamp generation unit 52 generates information (timer value) about the date and time when the command code is output. The time stamp generation unit 52 transmits the generated timer value to the buffer management unit 53.

The buffer management unit 53 includes an access register 54. The access register 54 stores the storage address of the debugging information in the SRAM 34 and a buffer address to which the debugging information is written in the host device 20. The address in the SRAM 34 or the buffer address in the host device 20 is designated by the control firmware 37.

In the buffer management unit 53, when predetermined conditions are satisfied, the command fetch address is stored in the buffer management unit 53. When a difference between the command fetch addresses is greater than a threshold value during a tracing process, the buffer management unit 53 outputs the debugging information (for example, the command fetch address and the timer value) to the buffer address designated by the host device 20. In other words, the buffer management unit 53 monitors the command fetch address from the CPU 33 and stores the command fetch address in the SRAM 34 when a change in the difference between the addresses is greater than a reference value. In this way, successive command fetch addresses are ignored and discontinuous command fetch addresses are acquired.

The buffer management unit 53 transmits the debugging information (a set of the command fetch address and the timer value) to the SRAM 34. The buffer management unit 53 manages the debugging information to be written to the host device 20.

The SRAM 34 stores the debugging information to be transmitted to the host device 20. The debugging information stored in the SRAM 34 is transmitted to the host device 20 through the host IF 31A having a bus master function.

The buffer management unit 53 transmits an interrupt command to the CPU 33, for example, when a failure occurs. Then, the CPU 33 performs a process corresponding to the interrupt command.

Figure 3:
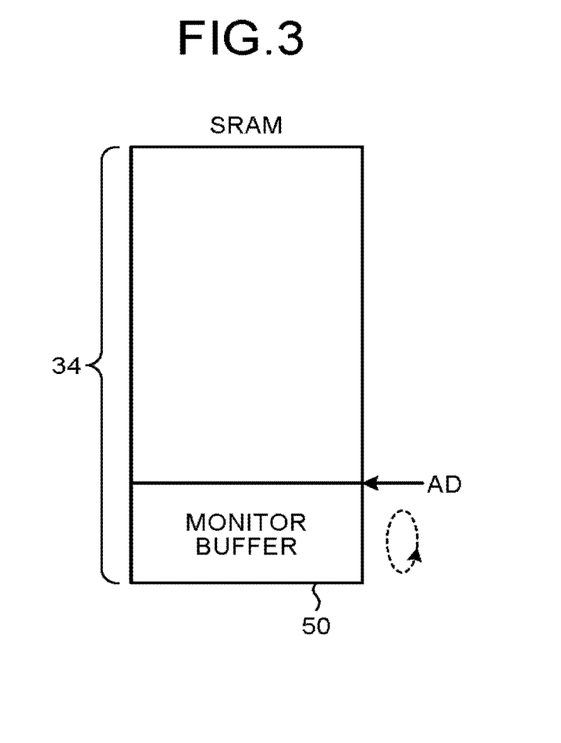
FIG. 3 is a diagram illustrating the structure of an SRAM provided in the memory controller.

FIG. 3 is a diagram illustrating the structure of the SRAM provided in the memory controller. A monitor buffer 50 is provided in the SRAM 34. The monitor buffer 50 is a buffer which stores the debugging information and is used as a ring buffer. The starting point address AD and buffer size of the monitor buffer 50 are managed by the access register 54. When the debugging information is stored in the monitor buffer 50, the starting point address AD and buffer size managed by the access register 54 are referred to.

The direct memory access controller (DMAC) 32 transmits the debugging information in the SRAM 34 to the host device 20. The DMAC 32 writes the debugging information to the DRAM 23 the host device 20 through the host IF 31A.

Figure 4:
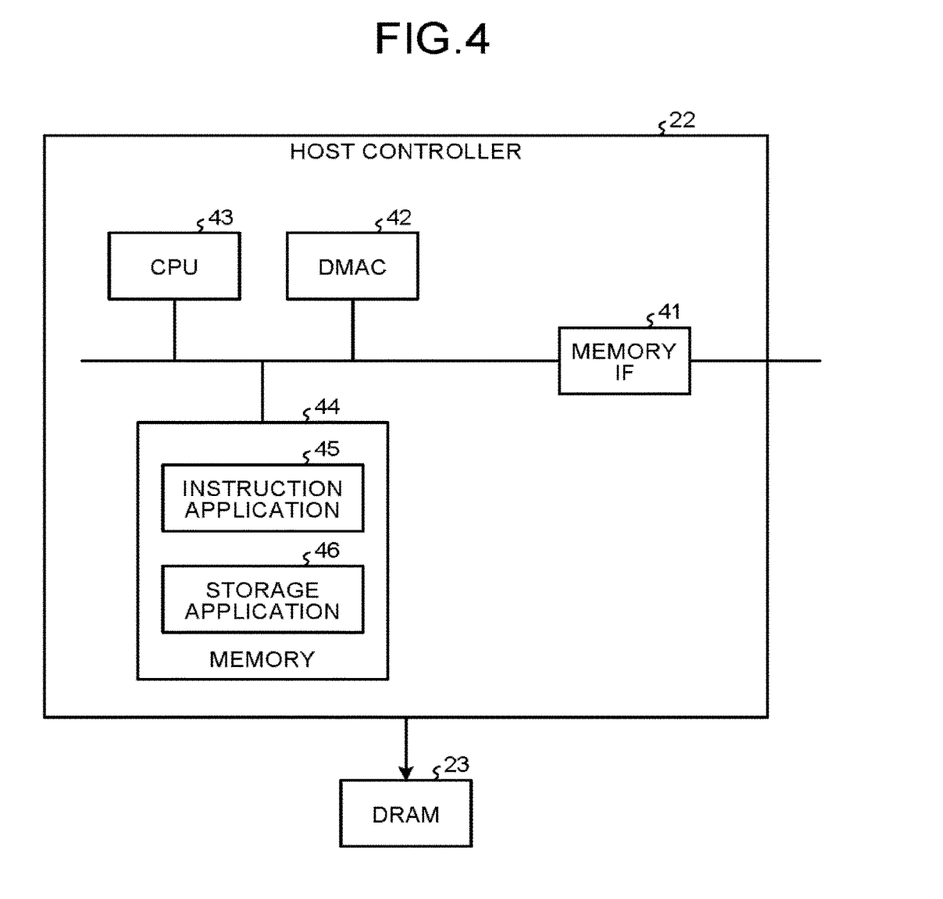
FIG. 4 is a diagram illustrating an example of the structure of a host controller according to the first embodiment.

FIG. 4 is a diagram illustrating an example of the structure of the host controller according to the first embodiment. The host controller 22 includes a memory interface (IF) 41, a DMAC 42, a CPU 43, and a memory 44. In the host controller 22, the memory IF 41, the DMAC 42, the CPU 43, and the memory 44 are connected to each other by a bus.

The memory IF 41 controls a communication interface with the memory system 10A. The memory IF 41 receives various commands output from the memory system 10A or transmits and receives data to and from the memory system 10A. The memory IF 41 is, for example, PCIe. In this embodiment, the debugging information is transmitted from the memory system 10A to the host device 20 through the memory IF 41 which is used to read and write data from and to the memory system 10A.

The memory 44 stores an instruction application 45 and a storage application 46 which are software programs. The instruction application 45 and the storage application 46 are read and executed by the CPU 43. The CPU 43 reads the instruction application 45 and the storage application 46 from the memory 44, develops the instruction application 45 and the storage application 46 in a predetermined program storage area, and performs various processes in the instruction application 45 and the storage application 46.

In this embodiment, the instruction application 45 transmits instruction information (vendor command) to the memory system 10A. The instruction information includes, for example, a trace start command, a trace stop command, and the buffer address of the DRAM 23.

In this embodiment, the storage application 46 is an application used to store the debugging information in the DRAM 23. The storage application 46 regularly writes the debugging information output from the memory system 10A from the DRAM 23 to the HDD 40. The instruction application 45 and the storage application 46 may be one application or separate applications.

Figure 5:
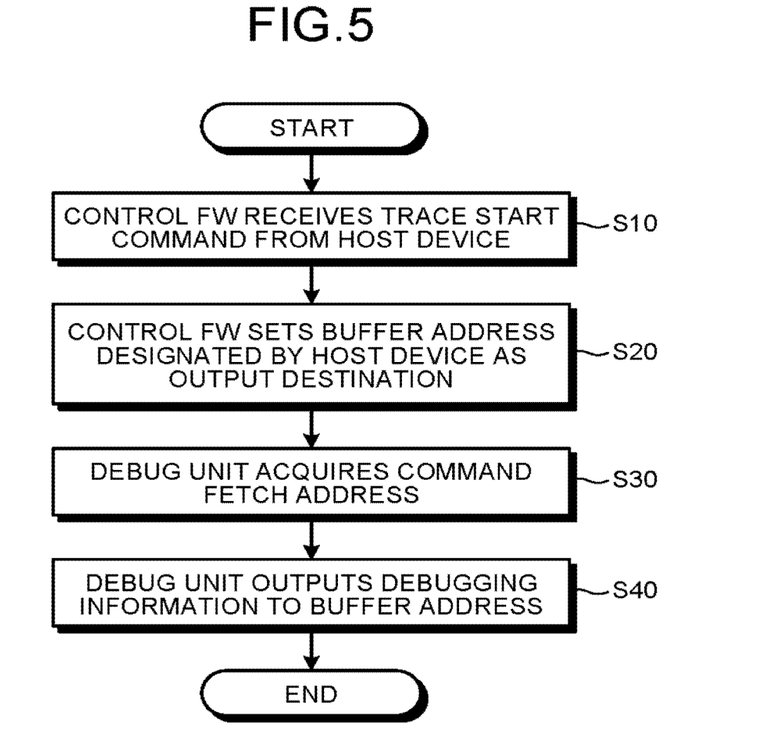
FIG. 5 is a flowchart illustrating the procedure of a tracing process of the memory controller according to the first embodiment.

FIG. 5 is a flowchart illustrating the procedure of the tracing process of the memory controller according to the first embodiment. When the control firmware 37 receives a trace start command from the host device 20 (Step S10), the memory controller 13A starts a debugging information acquisition process.

The control firmware 37 sets the buffer address designated by the host device 20 as the output destination of the debugging information (Step S20). The buffer address designated by the host device 20 is the address of the DRAM 23.

The debug unit 35 acquires the command fetch address while the tracing process is being performed (Step S30). Specifically, the HW monitor 51 monitors the bus in the memory controller 13A. When predetermined conditions are satisfied, the HW monitor 51 reads the command code and stores the command code as the command fetch address. In this case, the time stamp generation unit 52 generates a timer value when the command code is output and transmits the generated timer value to the buffer management unit 53.

The buffer management unit 53 of the debug unit 35 outputs the debugging information to the buffer address (DRAM 23) designated by the host device 20 when a change in the difference between the command fetch addresses during the tracing process is equal to or greater than a threshold value (Step S40). The debugging information includes the command fetch address and the timer value.

Figure 6:
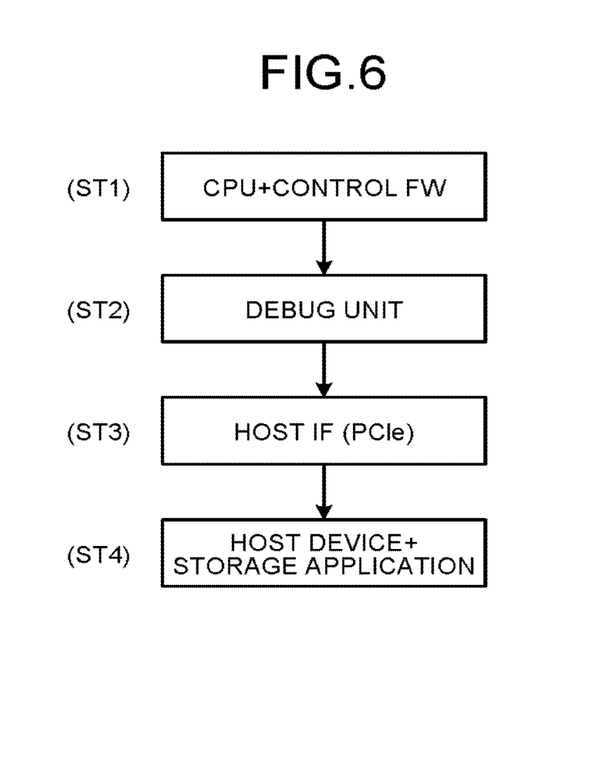
FIG. 6 is a diagram illustrating the procedure of a debugging information acquisition process according to the first embodiment.

FIG. 6 is a diagram illustrating the procedure of the debugging information acquisition process according to the first embodiment. In this embodiment, the CPU 33, which is a general-purpose CPU, and the control firmware (FW) 37 receive the trace start command and set the output destination of the debugging information (ST1).

Then, the debug unit 35 generates debugging information including a command fetch address and a timer value (ST2). The debug unit 35 stores the debugging information in the SRAM 34. Then, the DMAC 32 transmits the debugging information in the SRAM 34 to the host device 20 through the host IF 31A (PCIe) (ST3).

Then, the host device 20 and the storage application 46 provided in the host device 20 store the debugging information in the DRAM 23 (ST4). The debugging information stored in the DRAM 23 is stored in the HDD 40 with a predetermined period.

Figure 7:
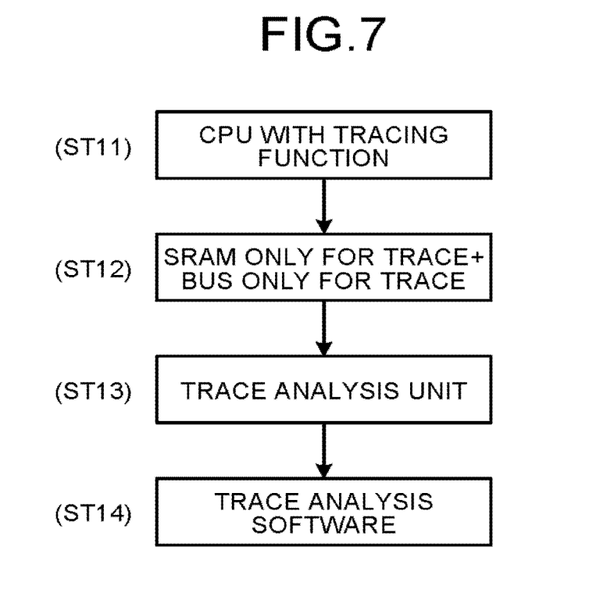
FIG. 7 is a diagram illustrating the procedure of a debugging information acquisition process without passing through a host IF.

The procedure of a debugging information acquisition process when the debugging information is acquired without passing through the host IF 31A will be described. FIG. 7 is a diagram illustrating the procedure of the debugging information acquisition process when the debugging information is acquired without passing through the host IF 31A. When the debugging information is acquired without passing through the host IF 31A, trace information is acquired by a memory controller 13X (not illustrated) different from the memory controller 13A.

The memory controller 13X includes a CPU with a tracing function, a SRAM only for a trace, and a bus only for a trace. The memory controller 13X is connected to a trace analysis unit and the debugging information is analysed by trace analysis software.

Specifically, when the debugging information is acquired without passing through the host IF 31A, the CPU with a tracing function acquires the debugging information (ST11). Then, the memory controller 13X outputs the debugging information to the trace analysis unit, using the SRAM only for a trace and the bus only for a trace (ST12 and ST13). The trace analysis unit is hardware. The debugging information output to the trace analysis unit is analysed by the trace analysis software (ST14).

Figure 8:
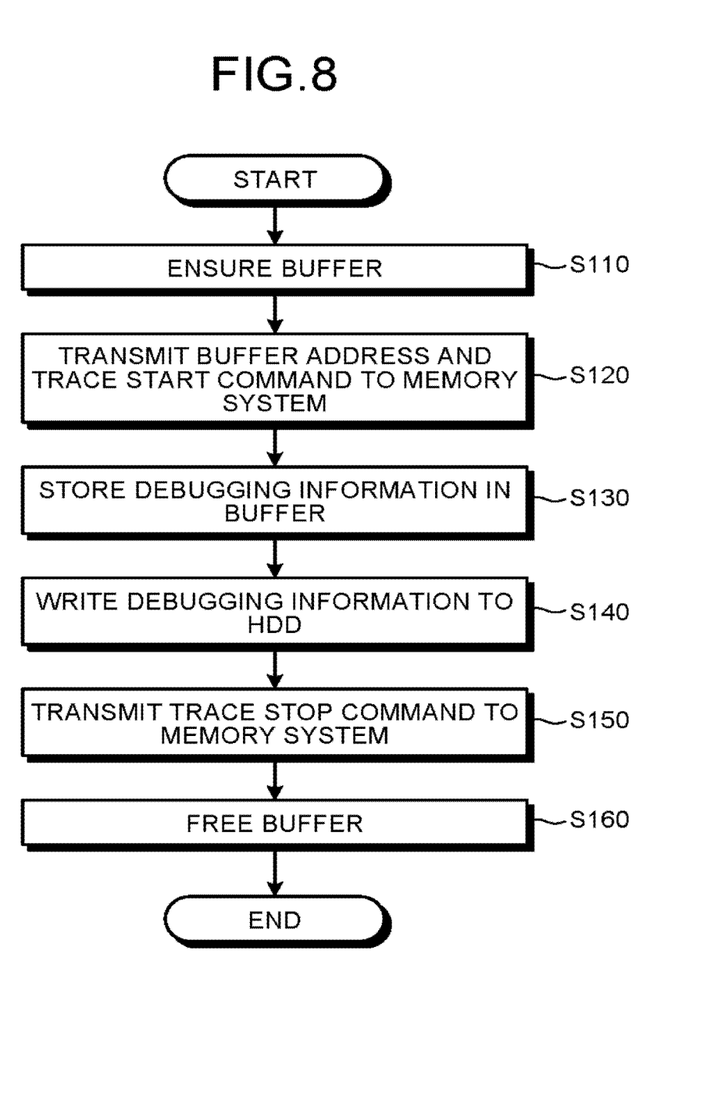
FIG. 8 is a flowchart illustrating the procedure of the operation of the host device according to the first embodiment.

Next, a debugging information storage process performed by the host device 20 will be described. FIG. 8 is a flowchart illustrating the procedure of the operation of the host device according to the first embodiment. The procedure of the debugging information storage process performed by the host device 20 will be described with reference to FIG. 8.

The instruction application 45 allocates a buffer for storing the debugging information (Step S110). The buffer is the monitor buffer 50 of the SRAM 34. The instruction application 45 transmits the buffer address (the starting point address AD and buffer size) of the allocated buffer and the trace start command as the instruction information to the memory system 10A (Step S120). In this case, the instruction information is transmitted from the memory IF 41 to the memory controller 13A.

Then, when the debugging information is transmitted from the memory controller 13A, the debugging information is transmitted to the DRAM 23 through the memory IF 41. Then, the debugging information is transmitted to the buffer address which is designated by the memory controller 13A in the DRAM 23. Then, the debugging information is stored in the buffer address of the buffer designated by the memory controller 13A (Step S130).

The storage application 46 writes the debugging information in the DRAM 23 to the HDD 40 at a predetermined time (Step S140). Then, the storage application 46 transmits the trace stop command as the instruction information to the memory system 10A (Step S150). Then, the storage application 46 frees (releases) the allocated buffer (Step S160).

As such, in this embodiment, the memory system 10A is configured so as to be connected to the host device 20. The memory system 10A includes the host IF 31A which receives the read command and the write command and a processor such as the CPU 33. The CPU 33 executes the control firmware 37 for controlling the memory system 10A. The control firmware 37 has a function of receiving the vendor command, which is the instruction information, from the host device 20 and a function of setting the buffer address in the DRAM 23 of the host device 20.

In addition, the memory system 10A includes a non-volatile memory such as the NAND memory 11. The NAND memory 11 reads data in response to the read command and stores data in response to the write command.

The memory system 10A includes the debug unit 35. When the CPU 33 executes the control firmware 37, the debug unit 35 collects the debugging information. In addition, the debug unit 35 is configured so as to output the debugging information to a buffer area (DRAM 23) indicated by the buffer address through the host IF 31A.

According to this structure, even when a dedicated debugger is connected to the memory system 10A, it is possible to easily obtain the debugging information at a low cost. Specifically, it is possible to easily obtain the debugging information, without upgrading the CPU 33 to a higher-level processor. Therefore, it is possible to prevent the generation of additional piece royalty. In addition, since a command trace unit is not required, it is possible to prevent the generation of additional piece royalty.

In addition, it is possible to prevent an increase in the number of debugger pins for connection to SWD or JTAG and to prevent an increase in the number of trace pins. It is not necessary to add an SRAM only for a trace. Furthermore, it is not necessary to introduce a debugger and a debugger application. Even when the memory system 10A is shipped with a debugger function turned off, the debugger function can be turned on to perform trace output after shipment.

The use of the memory system 10A according to this embodiment makes it possible to perform a trace in real time for a long time during the development of the firmware of the memory controller 13A which has been scaled up. In addition, it is possible to obtain coverage information from the debugging information and the quality of firmware is expected to be improved. The coverage information indicates a metric or an index and is, for example, a coverage ratio indicating the number of times a source code is written.

As such, according to the first embodiment, the memory system 10A transmits the debugging information to the host device 20 through the host IF 31A using PCIe. Therefore, it is possible to easily obtain the debugging information at a low cost.

Second Embodiment

Next, a second embodiment will be described with reference to FIGS. 9 and 10. In the second embodiment, a universal flash storage (UFS) is used as a host IF. Debugging information is transmitted to a host device 20 using the UFS and unified memory extension (UME).

Figure 9:
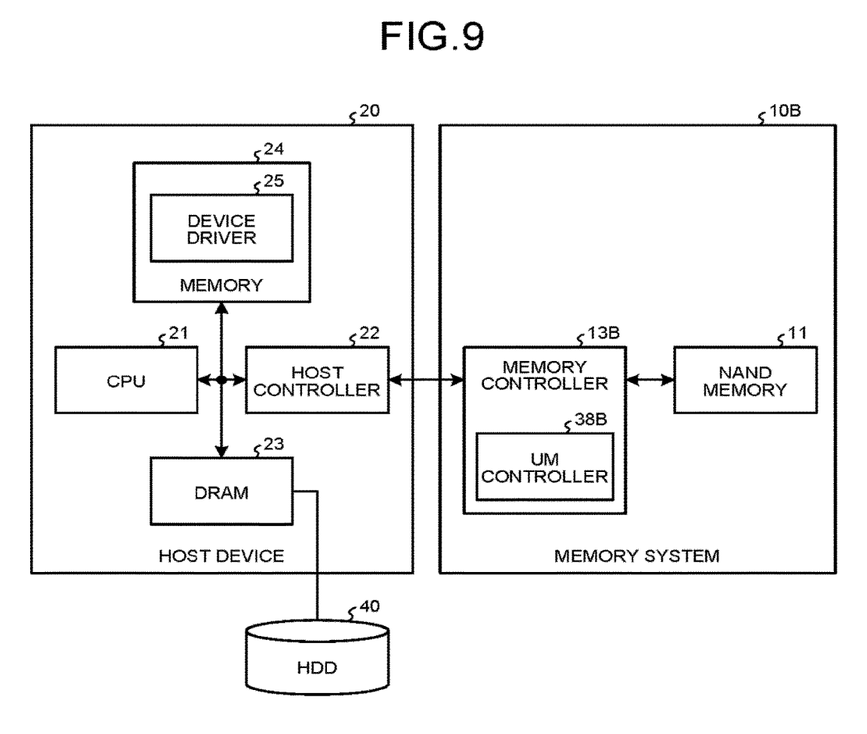
FIG. 9 is a diagram illustrating an example of the structure of an information processing system according to a second embodiment.

FIG. 9 is a diagram illustrating an example of the structure of an information processing system according to the second embodiment. Among the components illustrated in FIG. 9, components having the same functions as those in the information processing system according to the first embodiment illustrated in FIG. 1 are denoted by the same reference numerals and the description thereof will not be repeated.

The information processing system according to this embodiment operates using a unified memory architecture (UMA). In the UMA, the host device 20 and a memory system 10B share a DRAM 23. Specifically, the DRAM 23 is shared by a CPU 21 of the host device 20 and a CPU 33 of the memory system 10B.

The information processing system includes host device 20 and the memory system 10B. The memory system 10B is configured so as to be connected to the host device 20. The memory system 10B communicates with the host device 20 using the UFS and the UME.

The memory system 10B includes a NAND memory 11 and a memory controller 13B. The NAND memory 11 and the memory controller 13B are connected to each other by a bus. The memory controller 13B has the same functions as the memory controller 13A. In this embodiment, the memory controller 13B includes a UM controller 38B.

For example, an embedded flash memory based on a UFS standard or a solid state drive (SSD) can be applied to the memory system 10B. The UM controller 38B is a UM access module which operates using the UMA. The UM controller 38B transmits the debugging information to the host device 20 through the host IF 31B, using the UFS and the UME. In this embodiment, the host IF 31B transmits and receives user data to and from the host device 20 using a first protocol, and transmits the debugging information to the host device 20 using a second protocol (UFS+UME). In other words, the host IF 31B transmits the debugging information to the host device 20 using a communication protocol which is different from that used to transmit a write command and a read command.

Figure 10:
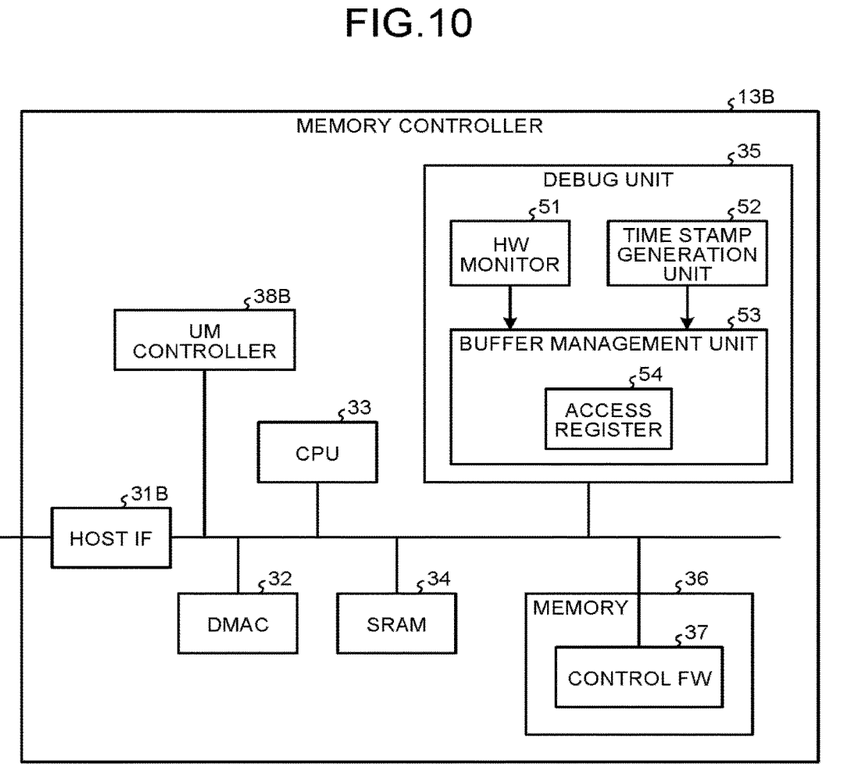
FIG. 10 is a diagram illustrating an example of the structure of a memory controller according to the second embodiment.

FIG. 10 is a diagram illustrating an example of the structure of the memory controller according to the second embodiment. The memory controller 13B includes the UM controller 38B in addition to the components of the memory controller 13A. Specifically, the memory controller 13B includes the host IF 31B, a DMAC 32, the CPU 33, a SRAM 34, a debug unit 35, a memory 36, and the UM controller 38B. In the memory controller 13B, the host IF 31B, the DMAC 32, the CPU 33, the SRAM 34, the debug unit 35, the memory 36, and the UM controller 38B are connected to each other by a bus.

The UM controller 38B transmits the debugging information in the SRAM 34 to the host device 20. The UM controller 38B writes the debugging information to the DRAM 23 of the host device 20 through the host IF 31B.

Figure 11:
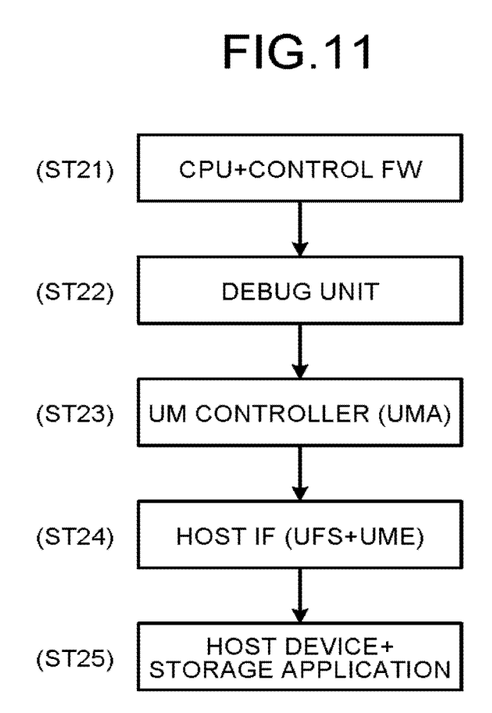
FIG. 11 is a diagram illustrating the procedure of a debugging information acquisition process according the second embodiment.

FIG. 11 is a diagram illustrating the procedure of a debugging information acquisition process according to the second embodiment. In this embodiment, similarly to the first embodiment, the CPU 33, which is a general-purpose CPU, and control firmware (FW) 37 receive a trace start command and set the output destination of the debugging information (ST21).

Then, the debug unit 35 generates debugging information including a command fetch address and a timer value (ST22). The debug unit 35 stores the debugging information in the SRAM 34 (ST23). Then, the UM controller 38B, which is a UM access module, transmits the debugging Information in the SRAM 34 to the host device 20 through the host IF 31B (UFS+UME) (ST24).

Then, the host device 20 and a storage application 46 provided in the host device 20 stores the debugging information in the DRAM 23 (ST25). The debugging information stored in the DRAM 23 is stored in an HDD 40 with a predetermined period.

As such, according to the second embodiment, the memory system 10B transmits the debugging information to the host device 20 through the host IF 31B using the UFS and the UME. Therefore, it is possible to easily obtain the debugging information at a low cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host device, the host device including a memory, the memory system comprising:
a host interface configured to receive a read command and a write command;
a first non-volatile memory configured to store data transmitted by the host device; and
a memory controller configured to control the first non-volatile memory, the memory controller being configured to read, from the first non-volatile memory, data that corresponds to the read command, transmit the read data to the host device through the host interface, and write data that corresponds to the write command to the first non-volatile memory,
wherein the memory controller includes:
a debug unit configured to collect debugging information; and
a processor configured to execute firmware to control the memory system, the firmware having a function of receiving a debug command and a function of setting a buffer address to the debug unit, the buffer address indicating a buffer area allocated on the memory in the host device,
wherein the debug unit is capable of outputting the debugging information to the buffer area through the host interface when the processor executes the firmware,
the debug unit acquires, as a command fetch address, a command that satisfies predetermined conditions among commands output from the processor, and
when a change in the command fetch address is greater than a threshold value, the debug unit inserts the command fetch address and a timer value into the debugging information and transmits the debugging information to the host device, the timer value being date and time that the command fetch address had been acquired.

2. The memory system according to claim 1, wherein the host interface transmits the debugging information to the host device using the same communication protocol as the communication protocol used to transmit the read command and the write command.

3. The memory system according to claim 2,
wherein the host interface transmits the debugging information to the host device using peripheral component interconnect express.

4. The memory system according to claim 1,
wherein the host interface transmits the debugging information to the host device using a communication protocol different from the communication protocol used to transmit the read command and the write command.

5. The memory system according to claim 4,
wherein the host interface transmits the debugging information to the host device using universal flash storage and unified memory extension.

6. The memory system according to claim 1,
wherein, when the firmware receives a trace start command to start a trace as the debug command from the host device, the debug unit starts to collect the debugging information.

7. The memory system according to claim 1,
wherein, when the firmware receives a trace stop command to stop a trace as the debug command from the host device, the debug unit stops collecting the debugging information.

8. The memory system according to claim 1,
wherein the debug unit sets a buffer address in the memory of the host device, on the basis of the debug command from the host device.

9. The memory system according to claim 1, further comprising:
a buffer memory,
wherein the debugging information is stored in the buffer memory and is transmitted to the host device through the host interface.

10. The memory system according to claim 9,
wherein the debug unit manages the debugging information in the buffer memory.

11. The memory system according to claim 1, further comprising:
a second non-volatile memory that stores the firmware,
wherein the processor reads the firmware from the second non-volatile memory and executes the firmware.

12. An information processing system comprising:
a host device including a memory; and
a memory system that is connected to the host device
wherein the memory system includes:
　　a host interface configured to receive a read command and a write command;
　　a first non-volatile memory configured to store data transmitted by the host device; and
　　a memory controller configured to control the first non-volatile memory, the memory controller being configured to read, from the first non-volatile memory, data that corresponds to the read command, transmit the read data to the host device through the host interface, and write data that corresponds to the write command to the first non-volatile memory,
wherein the memory controller includes:
a debug unit configured to collect debugging information; and
a processor configured to execute firmware to control the memory system, the firmware having a function of receiving a debug command and a function of setting a buffer address to the debug unit, the buffer address indicating a buffer area allocated on the memory in the host device,
wherein the debug unit is capable of outputting the debugging information to the buffer area through the host interface when the processor executes the firmware,
the host device stores the debugging information in the buffer area,
the debug unit acquires, as a command fetch address, a command that satisfies predetermined conditions among commands output from the processor, and
when a change in the command fetch address is greater than a threshold value, the debug unit inserts the command fetch address and a timer value into the debugging information and transmits the debugging information to the host device, the timer value being date and time that the command fetch address had been acquired.

13. The information processing system according to claim 12,
wherein the host device transmits a trace start command to instruct the memory system to start a trace as the debug command to the memory system.

14. The information processing system according to claim 12,
wherein the host device transmits a trace stop command to instruct the memory system to stop a trace as the debug command to the memory system.

15. The information processing system according to claim 12,
wherein the host device allocates an area having successive physical addresses as the buffer area and transmits the buffer address of the buffer area as the debug command to the memory system.

16. The information processing system according to claim 15,
wherein the host device maps a correspondence relationship between the physical address and a logical address in the buffer area.

17. The information processing system according to claim 12,
wherein the host device outputs the debugging information in the buffer area to a third non-volatile memory.

* * * * *